(12) United States Patent
Palanichamy et al.

(10) Patent No.: US 8,734,988 B2
(45) Date of Patent: May 27, 2014

(54) LITHIUM BATTERIES HAVING ANODES BASED ON POLYTHIOCYANOGEN

(75) Inventors: Krishnan Palanichamy, Portage, MI (US); Suresh G. Advani, Newark, DE (US); Ajay K. Prasad, Newark, DE (US)

(73) Assignee: University of Delaware, Newark, DE (US)

( * ) Notice: Subject to any disclaimer, the term of this patent is extended or adjusted under 35 U.S.C. 154(b) by 138 days.

(21) Appl. No.: 13/188,969

(22) Filed: Jul. 22, 2011

(65) Prior Publication Data

US 2012/0034534 A1     Feb. 9, 2012

Related U.S. Application Data

(60) Provisional application No. 61/637,265, filed on Jul. 23, 2010.

(51) Int. Cl.
*H01M 4/13*   (2010.01)
*H01M 4/60*   (2006.01)
*H01M 4/02*   (2006.01)
*H01M 6/16*   (2006.01)

(52) U.S. Cl.
USPC ............ 429/213; 429/212; 429/209; 429/338

(58) Field of Classification Search
None
See application file for complete search history.

(56) References Cited

U.S. PATENT DOCUMENTS

| 3,445,290 | A | 5/1969 | Elliott |
| 3,679,480 | A | 7/1972 | Brown |
| 3,928,067 | A | 12/1975 | Broadhead et al. |
| 4,192,912 | A | * 3/1980 | Rao ............................... 429/105 |
| 2008/0213664 | A1 | 9/2008 | Krasnov et al. |

FOREIGN PATENT DOCUMENTS

JP      07-006761    * 1/1995

OTHER PUBLICATIONS

Machine translation of JP 07-006761.*
Perera et al, Construction of a Photovoltaic Device by Deposition of Thin Films of the Conducting Polymer Polythiocyanogen, 143 Synth. Metals 283-87 (2004).*
International Search Report dated Mar. 20, 2012.
Bowman, W. R. et al., "Investigations on Organo-Sulfur-Nitrogen Rings and the Thiocyanogen Polymer, (SCN)x," Chem. Eur. J. 2006, 12, 6366-6381.
Oyama, N. et al., "New Organosulfur Polymer Lithium Battery with High Energy Density-Controlled Electron Transfer Reaction of Organosulfur Materials and Its Application to Energy Storage," Proceedings of the First Battery Technology Symposium, pp. 203-210, 2004.
Sarukawa, T. et al., "Electrochemical Activity of Sulfur-Linked Tetrathionaphthalene Polymer," Journal of the Electrochemical Society, 2010, 157(2), F23-F29.
Trofimov, B. A. et al., "Ethynedithiol-Based Polyeneoligosulfides as Active Cathode Materials for Lithium-Sulfur Batteries," Journal of Applied Polymer Science 2008, 107, 784-787.
Xu, G.-X. et al., "Inorganic polymer phosphazene disulfide as cathode material for rechargeable lithium batteries," Solid State Ionics 2006, 177, 305-309.

(Continued)

*Primary Examiner* — Yoshitoshi Takeuchi
(74) *Attorney, Agent, or Firm* — RatnerPrestia

(57) ABSTRACT

A lithium ion battery is provided which contains a cathode, an anode, an electrolyte and a separator, wherein the anode employs polythiocyanogen as an active material.

12 Claims, 2 Drawing Sheets

(56) References Cited

OTHER PUBLICATIONS

Xu, G.-X. et al., "A Novel Inorganic Polymer as Cathode Material for Secondary Lithium Batteries," Macromol. Mater. Eng. 2005, 290, 996-100.

Xue, L. J. et al "Anthracene based organodisulfide positive active materials for lithium secondary battery," Electrochemistry Communications 2003, 5, 903-906.

Zhang, J. Y. et al., "Sulfides organic polymer: Novel cathode active material for rechargeable lithium batteries," Journal of Power Sources 2007, 168, 278-281.

Written Opinion of International Searching Authority mailed Jan. 31, 2013 for Int'l appl. No. PCT/US2011/045000.

\* cited by examiner

LITHIUM BATTERIES HAVING ANODES BASED ON POLYTHIOCYANOGEN

CROSS-REFERENCE TO RELATED APPLICATION

This application claims priority from U.S. provisional application 61/367,265, filed Jul. 23, 2010, and incorporated herein by reference in its entirety for all purposes.

STATEMENT REGARDING FEDERALLY SPONSORED RESEARCH OR DEVELOPMENT

This invention was made with United States government support funded by the Federal Transit Administration (FTA) under grant number DE 55-7001-00. The United States government has certain rights in the invention described herein.

FIELD OF THE INVENTION

The invention pertains to rechargeable lithium ion battery technology which employs an anode containing polythiocyanogen as an active material.

BACKGROUND OF THE INVENTION

Lithium-ion battery (LIB) technology has advanced along with the growth of the consumer electronic market and rechargeable LIBs are the most popular choice to power devices such as laptops, cellphones, cameras, etc. Moreover, LIBs are now being considered as "green power sources" for automobiles to replace internal combustion engines, mainly to abate global warming by reducing carbon emissions. In current LIBs, graphite is used as the negative electrode (anode) and a layered or spinal lithium metal oxide ($LiCoO_2$, $LiMn_2O_4$) or olivine-phase lithium iron phosphate ($LiFePO_4$) is used as the positive electrode (cathode). The graphite anode has a theoretical charge capacity of 372 $mAhg^{-1}$, and the above-mentioned cathodes have capacities in the range of 150-200 $mAhg^{-1}$. The LIB electrodes are manufactured by energy-intensive ceramic manufacturing processes. Lithium insertion potential of the negative electrode is close to that of lithium plating potential. Hence, during low-temperature charging, lithium metal may get plated on the surface of the graphite anode which limits the overcharge protection. In addition, the graphite anode has low volumetric energy density. The layered-oxide positive electrodes, apart from having low capacity, are also the sites of thermal runaway reactions during accidental overcharge. Hence, there is a need for safe, inexpensive, high-capacity LIB electrode materials so that LIBs can compete with traditional power sources in various applications.

BRIEF SUMMARY OF THE INVENTION

Polythiocyanogen $(SCN)_x$ has now been found to be useful as a component of a negative electrode in a LIB. $(SCN)_x$ is an inexpensive inorganic polymer that has a high theoretical capacity of 462 $mAhg^{-1}$ and repetitive —S—S— bonds as well as a conjugated electronic structure. $(SCN)_x$ can be prepared in a single step by chemical oxidation of thiocyanate ($SCN^-$) anion using $Cl_2$ or $Br_2$ as the oxidizing agents, or by electrochemical oxidation.

The present invention thus provides a lithium ion battery comprising a cathode, an anode comprising polythiocyanogen as an anode-active material, an electrolyte and a separator.

DETAILED DESCRIPTION OF THE INVENTION

Figure 1A:
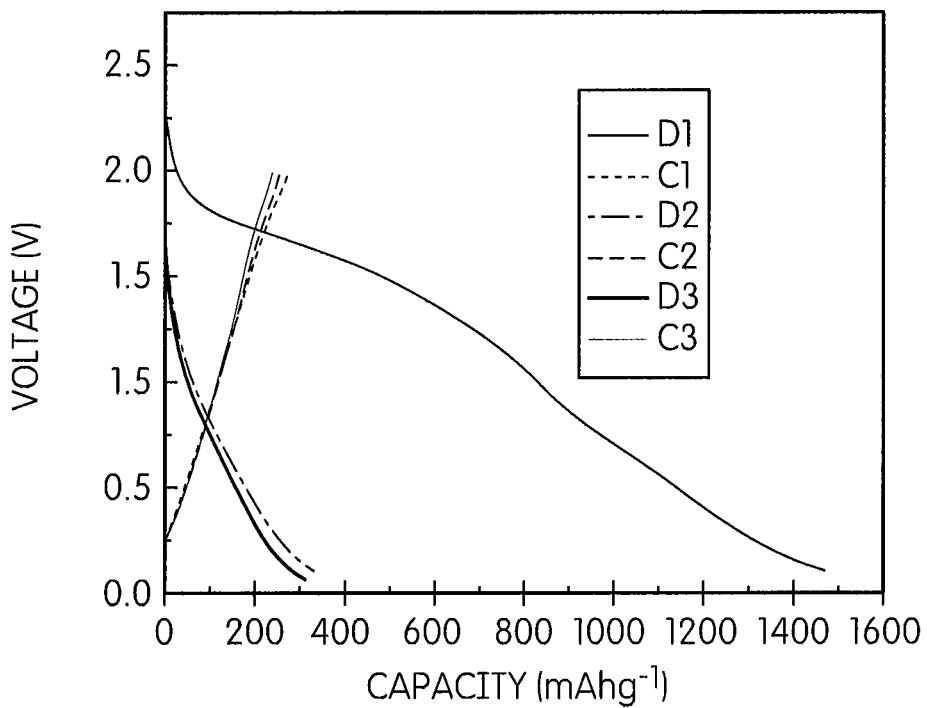
FIG. 1(a) shows charge-discharge curves for the first three discharge-charge cycles at 0.2 C for an electrode in accordance with the invention, as described in the Examples (C=charge cycle, D=discharge cycle).

The anode employed in the battery of the present invention has polythiocyanogen as an anode-active material. Polythiocyanogens (sometimes also referred to as parathiocyanogens) correspond to the formula: $(SCN)_x$, wherein x is 3 or greater. In general, the variable x may be any numerical value greater than 2 including extremely large values signifying very long chain macropolymers. Lower values, e.g., 3, 4 or the like are also contemplated. In various embodiments of the invention, x may be 3 to 1000 or 3 to 10,000.

The polythiocyanogen may be prepared by any suitable or conventional method known in the art. Polythiocyanogen may be obtained, for example, by polymerizing thiocyanogen or a halothiocyanogen, which may be synthesized by chemical oxidation or electrochemical oxidation. When thiocyanate is oxidized by a chemical oxidizing agent, thiocyanogen is first produced which is stable only at low temperatures and in solution. Thiocyanogen and halothiocyanogen are gaseous compounds at room temperature and atmospheric pressure, which undergo spontaneous polymerization upon heating to high temperatures or upon removal of solvent, thereby yielding polythiocyanogen.

For example, polythiocyanogen preparation methods include polymerization of a thiocyanogen or thiocyanogen-containing material of the formula $(SCN)_x$ where x is 2 or 3, halothiocyanogens of the formula YSCN where Y is F, Cl, Br and I and metal thiocyanogens of the formula $M(SCN)_x$ where M is Pb, Li, Na, K, Cu, Ni, Co, $NH_4^+$ and the like and x is either 2 or 3. The above thiocyanogen or thiocyanogen-containing materials of the formula $(SCN)_x$ where x is 2 or 3, halothiocyanogens of the formula YSCN where Y is F, Cl, Br and I and metal thiocyanogens of the formula $M(SCN)_x$ where M is Pb, Li, Na, K, Cu, Ni, Co, $NH_4^+$ and the like and x is either 2 or 3 could be prepared by chemical or electrochemical oxidation of $NH_4SCN$, NaSCN and KSCN, $Cl_2$. $Br_2$, $I_2$, $KMnO_4$, $K_2Cr_2O_7$ and any suitable oxidizing agents could be employed for the chemical oxidation. The electrochemical oxidation could be carried out employing the electrolysis process known in the prior art. Graphite, Pt, steel, Pb and the like could be used as suitable anodes. The cathodes could be graphite, Pt, stainless steel and the like. Nonaqueous solvents such as acetonitrile, acetone, acetic acid, methanol can be used, as well as aqueous/nonaqueous mixed solvents such as dilute solutions of HCl, $H_2SO_4$, or $HNO_3$ as the aqueous phase and dichloromethane, dichloroethane, chloroform or carbon tetrachloride as the nonaqueous solvent.

Substances suitable for use as polythiocyanogen precursors include the following:

halothiocyanogens of the formula YSCN, wherein Y is a halogen selected from the group consisting of F, Cl, Br and I;

thiocyanogen complexes of a metal ion. For example, $Li(SCN)_3^-$, $Na(SCN)_3^-$, $K(SCN)_3^-$ and $Zn(SCN)_3^-$ may be used. Also, higher numbers of thiocyanogen are suitable, e.g., $Li(SCN)_b^-$ wherein b is a value greater than 2;

ammonium thiocyanate complexes of thiocyanogen $(SCN)_2$. These include the alkyl and aryl ammonium thiocyanate thiocyanogen complexes as well as the quaternary ammonium thiocyanate thiocyanogen complexes. For example, those of the formula $R_4NSCN.(SCN)_2$ wherein R is an alkyl group, e.g. $CH_3$, $C_2H_5$, etc., aryl group, e.g. $C_6H_5$, and/or hydrogen, subject to the proviso that not all Rs are hydrogen. Also included are those of the formula R'SCN.$(SCN)_2$ wherein R' is a quaternary radical such as pyridinium, quinolinium or morpholinium; and ammonium thiocyanate complexes of halothiocyanogen of the formula YSCN. This includes those of the formulas $R_4NSCN.YSCN$ and R'SCN.YSCN wherein the variables are as defined above.

In one embodiment, the polythiocyanogen is in the form of a powder, e.g., finely divided particles. The particles may be agglomerated. If so desired, the particle size and physical form of the polythiocyanogen may be altered by conventional techniques such as milling, grinding or trituration, either before or after combining with the other components of an electrode paste such as binder, electrically conductive material and solvent.

In one embodiment of the invention, the polythiocyanogen is doped with at least one dopant. The dopant may, for example, be a dopant capable of dissociation to provide an anionic species, such as a dopant selected from the group consisting of iodine, lithium perchlorate ($LiClO_4$), lithium hexafluorophosphate ($LiPF_6$), and lithium tetrafluoroborate ($LiBF_4$). The amount of dopant is not considered particularly critical and may be varied as desired to impart certain characteristics to the resulting electrode. For example, in various embodiments of the invention, the polythiocyanogen may be doped with 5 to 50 weight % or 8 to 12 weight % dopant.

One embodiment of the invention provides a rechargeable lithium battery. Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. Structures and fabricating methods for lithium ion batteries are well known in the art.

The rechargeable lithium battery may be fabricated with a negative electrode (anode) including a negative active material constructed as one embodiment according to the principles of the present invention, a positive electrode (cathode) including a cathode (positive active) material, and an electrolyte, preferably a non-aqueous electrolyte.

The anode (negative electrode) generally includes a negative current collector and a negative active material layer disposed on the current collector. The anode active material layer includes an anode (negative) active material which is a polythiocyanogen. The anode active material layer also typically includes at least one binder and at least one electrically conductive material. The relative ratios of the polythiocyanogen, binder and electrically conductive material may be varied and optimized as may be desired in order to achieve particular performance characteristics in the lithium battery. For example, the weight % of each component may be varied within the following ranges, in certain embodiments of the invention:

| | |
|---|---|
| polythiocyanogen | 50 to 70; |
| binder | 5 to 15; |
| electrically conductive material | 25 to 35; | with the total weight of these components equaling 100%.

The coating weight of the negative active material layer on the current collector may be varied and optimized as may be desired in order to achieve certain performance characteristics in the battery. Typically the loading of the polythiocyanogen on the current collector is from about 1 to about 10 $mg/cm^2$.

The binder improves binding properties of the negative active material particles to one another and to the current collector. The binder typically includes one or more polymers such as polyvinylalcohol, carboxylmethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, polyamide, and the like, but is not limited thereto.

The conductive material is used to endow an electrode with electrical conductivity and may include any electrically conductive material. Examples of the conductive material include carbon-based materials such as natural graphite, artificial graphite, carbon black, acetylene black, ketjen black, carbon fiber, and the like, metal-based materials such as metal powders or metal fibers of copper, nickel, aluminum, silver, and the like, conductive polymers such as polyphenylene derivatives, or mixtures thereof. The conductive material typically is in finely divided, particulate form.

The negative current collector may be any conductive material that does not chemically change within the range of charge and discharge electric potentials used. Typically, the current collector is comprised of a metal such as aluminum, copper, nickel, iron, titanium or cobalt or an alloy comprising at least one of these metals, or copper or stainless steel surface-coated with carbon, nickel or titanium. The current collector may be, for example, a film, a sheet, a mesh sheet, a punched sheet, a lath form, a porous form, a foamed form, a fibrous form, or a foil. Illustrative suitable negative current collectors include copper foils, nickel foils, stainless steel foils, titanium foils, nickel foams, copper foams, polymer substrates coated with one or more electrically conductive metals, and combinations thereof. The current collector is typically about 1 to about 500 microns thick.

The negative electrode (anode) may be fabricated by a method such as mixing the polythiocyanogen, the conductive material and the binder in a solvent to provide a negative active material composition (typically, in the form of a paste), and coating the negative current collector with the negative active material composition. Methods of coating current collectors with compositions effective to provide electrodes are well-known in the art and may be adapted for use in the present invention. The solvent may be N-methylpyrrolidone, water, and the like but it is not limited thereto.

The positive electrode (cathode) generally includes a positive current collector and a positive active material layer disposed on the current collector. The positive active material layer can be made of any conventionally known positive electrode material, but in one embodiment of the invention the positive active material layer contains a lithium-containing composite oxide as the active material. The lithium-containing composite oxide may contain, in addition to Li, at least one of Co, Ni and Mn. Suitable examples of the lithium-containing composite oxide include lithium-cobalt oxides, lithium nickel oxides and lithium-manganese oxides. Other types of lithium-containing substances may also be employed as the active material, such as lithium iron phosphate (particularly lithium iron phosphate having an olivine crystal structure). Modified forms of these substances may also be used, as is well known in the art, including for example a solid solution of aluminum or magnesium and lithium cobalt oxide, lithium nickel oxide in which part of the nickel is replaced by cobalt, and the like.

The positive active material layer may also include a binder and a conductive material. The positive electrode is typically produced by first preparing a positive electrode material mixture containing an active material, a conductive material and a resin binder, which is then applied onto both faces of a current collector.

The binder improves binding properties of the positive active material particles to one another, and also with an electrical current collector. Examples of these binders include at least one selected from the group consisting of polyvinylalcohol, carboxylmethylcellulose, hydroxypropylcellulose, diacetylcellulose, polyvinyl chloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, polyamides, and the like, but are not limited thereto.

The electrically conductive material is included to improve electrode conductivity. Any electrically conductive material may be used as the conductive material unless the material causes a chemical change. Examples of acceptable electrically conductive materials include one or more of natural graphite, artificial graphite, carbon black, acetylene black, ketjen black, carbon fiber, a metal powder or a metal fiber including copper, nickel, aluminum, or silver, and polyphenylene derivatives.

The positive current collector may be Al, but the positive current collector is not limited thereto.

The positive electrode (cathode) may be fabricated by a method such as mixing the positive active material, the conductive material and the binder in a solvent to provide a positive active material composition, and coating the positive current collector with the positive active material composition. The electrode manufacturing method is well-known and thus need not be described in any greater detail in the present specification. The solvent may be N-methylpyrrolidone, water, and the like but it is not limited thereto.

The electrolyte is preferably non-aqueous and includes at least one non-aqueous organic solvent and at least one lithium salt. The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent. Examples of carbonate-based solvents may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of ester-based solvents may include methyl acetate, ethyl acetate, n-propyl acetate, methylpropionate, ethylpropionate, γ-butyrolactone, decanolide, valerolactone, caprolactone, and the like. Examples of ether-based solvents include dibutyl ether, tetraglyme, diglyme, dimethoxyethane, 2-methyltetrahydrofuran, tetrahydrofuran, and the like, and examples of ketone-based solvents include cyclohexanone and the like. Examples of alcohol-based solvents include ethyl alcohol, isopropyl alcohol, and the like, and examples of aprotic solvents include nitriles such as R—CN (wherein R is a C2 to C20 linear, branched, or cyclic hydrocarbon, which may further include one or more double bonds, one or more aromatic rings, and/or one or more ether bonds), amides such as dimethylformamide, dioxolanes such as 1,3-dioxolane, sulfolanes, and the like.

The non-aqueous organic solvent may be a single solvent or a mixture of different solvents. When organic solvents are used in a mixture, the mixture ratio may be controlled in accordance with a desired battery performance.

The lithium salt supplies lithium ions in the battery, thereby enabling a basic operation of a rechargeable lithium battery, and improves lithium ion transportation between positive and negative electrodes. Non-limiting examples of the lithium salt include $LiPF_6$, $LiBF_4$, $LiSbF_6$, $LiAsF_6$, $LiN(SO_2C_2F_5)_2$, lithium trifluoromethasulfonate, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate, LiBOB). Mixtures of different lithium salts may be employed. The lithium salt may be used, for example, in a concentration ranging from about 0.1 M to about 2.0 M.

The separator is not particularly limited as long as it insulates the positive electrode from the negative electrode and lithium ions can transfer through the inside of the separator (inside the material constituting the separator or inside pores formed in the separator) and the material of the separator is stable when the lithium ion battery is being used. Non-limiting examples of suitable separator materials include polymers, particularly polyolefins such as polyethylene and polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator. The separator may have a porous structure (e.g., a microporous structure). The thickness of the separator is not particularly limiting and may, for example, be from about 2 to about 15 microns.

The present invention may be adapted for use in rechargeable lithium batteries having any of the configurations and designs known in the art. For example, the rechargeable lithium battery may be generally cylindrical in form and include a negative electrode, a positive electrode, a separator interposed between the negative electrode and positive electrode, an electolyte impregnating the separator, a battery case, and a sealing member sealing the battery case. The negative electrode, positive electrode, and separator may be sequentially stacked, spirally wound, and placed in a battery case to fabricate the rechargeable lithium battery.

EXAMPLES

Preparation of Polythiocyanogen, $(SCN)_x$

Trithiocyanate, $(SCN)_3^-$ was prepared by an electrochemical oxidation method as follows. Briefly, 65 ml of 1.0M $NH_4SCN$ in 0.5M $H_2SO_4$+65 ml MDC were taken in a 200 ml beaker-type electrochemical cell. Two graphite rods (1.0 cm diameter and 4.0 cm long) were used as the working as well as the counter electrodes. Constant-current electrolysis was carried out at 25 mA $cm^{-2}$ current density for 3.0 hrs. Electrolysis was carried out at 2° C. by keeping the electrochemical cell in a constant temperature bath. After the electrolysis, the organic phase (MDC) was separated from the aqueous phase in a separating funnel, and dried over anhydrous sodium sulfate. The clear solution of $(SCN)_3^-$ in MDC was transferred to a rotary vacuum evaporator over a water bath at 50° C. When all the solvent was evaporated, the $(SCN)_3^-$ instantly polymerized into an orange-red solid. The solid was scraped from the evaporating flask, dried at 110° C. under vacuum, and used in further experiments.

The FTIR spectrum of the prepared $(SCN)_x$ showed one very broad band in the range of 950-1300 $cm^{-1}$, and many small overlying shoulders. The spectrum closely matched the FTIR spectrum reported for $(SCN)_x$ in the literature. The strong, broad band around 1200 $cm^{-1}$ is due to —S—N= stretching, the shoulder at 1520 $cm^{-1}$ is due to =C=N— conjugated vibration, and signals at 1620-1640 $cm^{-1}$ are due to symmetric and asymmetric stretching of the =C=N— group. Hence, the FTIR spectrum confirms that the $(SCN)_x$ prepared as described herein is similar to that reported earlier by other researchers.

Battery Electrode Fabrication and Testing

A paste for the electrode coating was prepared by mixing $(SCN)_x$ active material, polyvinylidene fluoride as binder and Super-P® carbon black conducting additive in the wt % ratio of 60:10:30 using N-methylpyrrolidine as the solvent. The paste was coated on copper and aluminum foil collectors. The active material loading was 4-5 $mg/cm^2$. The electrolyte was 1.0 M $LiPF_6$ in a (1:1 wt %) mixture of ethylene carbonate and dimethyl carbonate. A Swagelok cell was assembled with lithium foil counter electrode and a Celgard® 2400 monolayer polypropylene separator inside a helium-filled glovebox. The cells were discharged and charged between 2.0 and 0.1 V vs. Li counter electrode at a constant rate of 0.2 C using a VERSATAT3 potentiostat/galvanostat from Princeton Applied Research (USA). All the voltages reported herein are with respect to a $Li/Li^+$ reference electrode.

Initial cyclic voltammetric studies of the above-mentioned cells indicated that the —S—S— bonds in $(SCN)_x$ undergo reduction at very negative potentials, i.e. below 1.5 V vs. $Li/Li^+$ and continue up to 0 V vs. $Li/Li^+$. Most of the reported —S—S— compounds undergo reduction in the potential range 1.0-2.5 V vs. $Li/Li^+$, and hence were studied as potential cathode materials. Due to the very negative redox potential of the —S—S— bonds, $(SCN)_x$ has now been found to be a suitable anode material for the fabrication of high-voltage rechargeable lithium-ion batteries by coupling with high-voltage cathodes such as $LiMn_2O_4$.

Figure 1B:
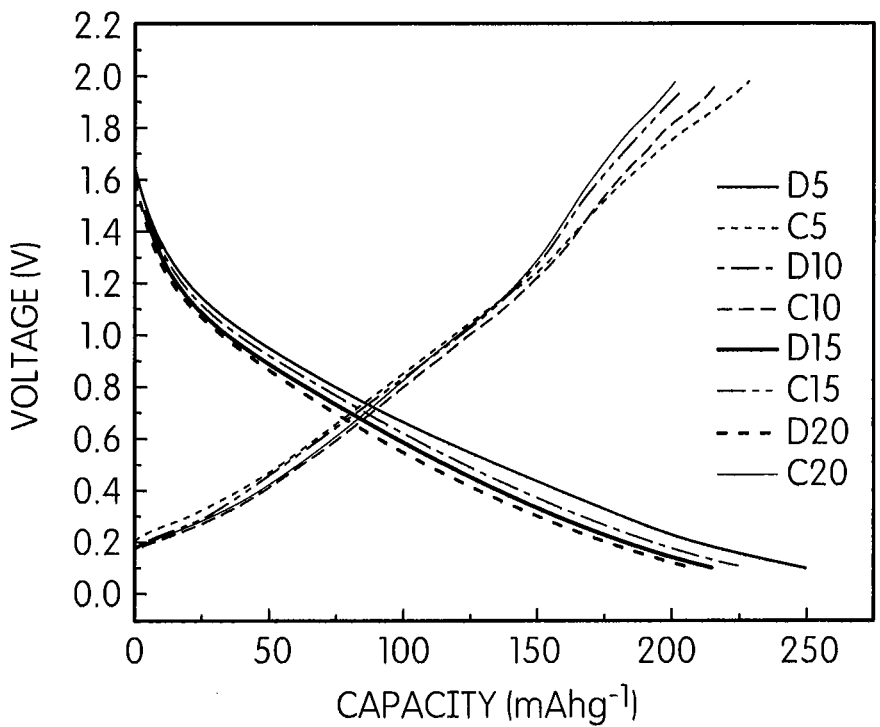
FIG. 1(b) shows charge-discharge curves for discharge-charge cycles five through twenty at 0.2 C for an electrode in accordance with the invention, as described in the Examples (C=charge cycle, D=discharge cycle).
Figure 2:
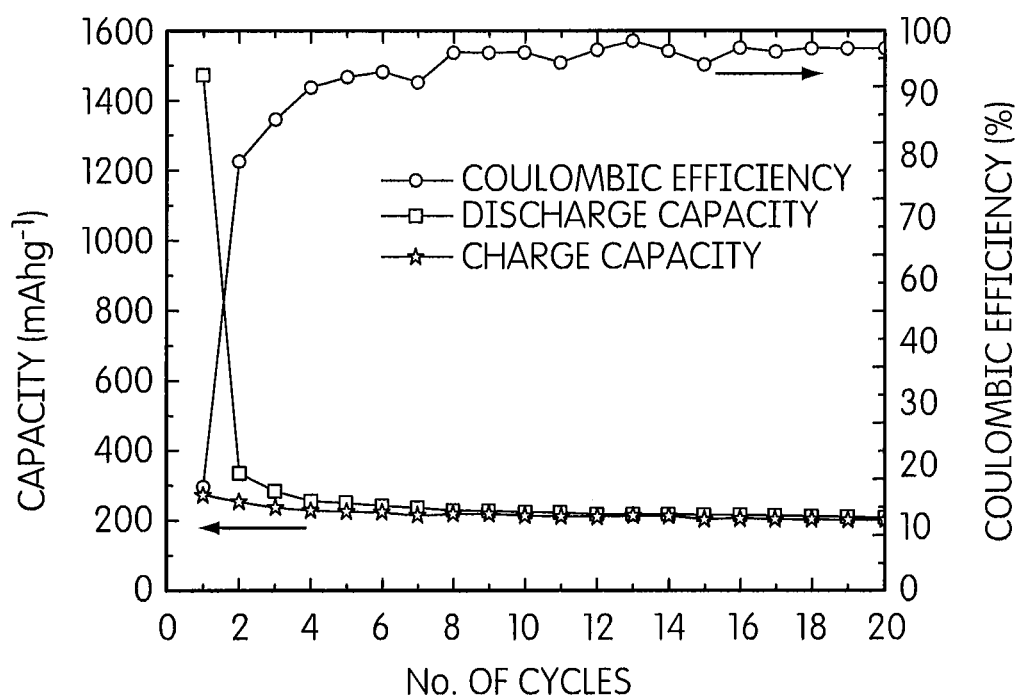
FIG. 2 illustrates cycling performance and coulombic efficiency at 0.2 C rate for an electrode in accordance with the invention, as described in the Examples.

In order to avoid the decomposition of $(SCN)_x$ on the electrode surface, the voltage range was restricted to 1.0-2.0 V vs. $Li/Li^+$ in a further set of experiments. The voltage profile vs. capacity for the first three discharge-charge cycles is shown in FIG. 1(a). The large irreversible capacity in the first cycle is due to SEI formation. The coulombic efficiency improved greatly from the second cycle onwards. In the $5^{th}$ cycle, the discharge-charge capacities were 250 and 229 $mAhg^{-1}$, respectively. The capacities of the $5^{th}$ to $20^{th}$ cycles are plotted in FIG. 1(b). It could be seen that the drop in capacity was much less than that observed when the potential range was 0-3.1 V. In fact, there is very little drop in performance between the $15^{th}$ and $20^{th}$ cycles. The drop in capacity after 10 cycles was very small; discharge-charge capacities at the $20^{th}$ cycle were 208 and 201 $mAhg^{-1}$, respectively, with a coulombic efficiency of about 97%. The cyclic performance along with Coulombic efficiency for the 20 cycles is shown in FIG. 2.

These results demonstrate that $(SCN)_x$ is suitable for use as an active material in lithium ion battery anodes.

What is claimed is:

1. A secondary lithium ion battery comprising:
   (a) a cathode comprised of
      a positive current collector and
      a positive active material layer disposed on the current collector,
      wherein the positive active material layer is comprised of a lithium-containing composite oxide containing, in addition to Li, at least one of Co, Ni and, Mn;
   (b) an anode comprised of
      a negative current collector comprised of aluminum, copper, nickel, iron, titanium or cobalt; an alloy comprising at least one of aluminum, copper, nickel, iron, titanium and cobalt; or copper or stainless steel, wherein said copper or said stainless steel is surface-coated with carbon, nickel, or titanium and
      a negative active material layer disposed on the negative current collector, wherein the negative active material layer is comprised of
         binder,
         electrically conductive material, and
         polythiocyanogen as an anode-active material,
         wherein polythiocyanogen is disposed on the negative current collector at a loading of from about 1 to about 10 $mg/cm^2$;
   (c) an electrolyte comprised of
      at least one lithium ion conducting salt dissolved in at least one organic carbonate; and,
   (d) a separator.

2. The secondary lithium ion battery of claim 1, wherein the negative active material layer is comprised of polythiocyanogen in particle form.

3. The secondary lithium ion battery of claim 1, wherein the polythiocyanogen is doped with at least one dopant.

4. The secondary lithium ion battery of claim 1, wherein the polythiocyanogen is doped with at least one dopant selected from the group consisting of iodine, lithium perchlorate ($LiClO_4$), lithium hexafluorophosphate ($LiPF_6$), and lithium tetrafluoroborate ($LiBF_4$).

5. The secondary lithium ion battery of claim 1, wherein the positive active material layer is comprised of a lithium-containing composite oxide selected from the group consisting of lithium cobalt oxide ($LiCoO_2$), lithium nickel oxide ($LiNiCoO_2$), lithium manganese oxide ($LiMn_2O_4$), lithium nickel cobalt manganese oxide $LiNi_{1/3}Co_{1/13}Mn_{1/3}O_2$, olivine phase lithium iron phosphate $LiFePO_4$ and olivine oxides.

6. The secondary lithium ion battery of claim 1, wherein the electrolyte is comprised of at least one of lithium hexafluorophosphate ($LiPF_6$) or lithium tetrafluoroborate ($LiBF_4$) dissolved in one or more solvents selected from the group consisting of ethylene carbonate, propylene carbonate, diethyl carbonate, and dimethyl carbonate.

7. The secondary lithium ion battery of claim 1, wherein the separator is comprised of a polyolefin.

8. The secondary lithium ion battery of claim 1, wherein the separator is porous and is comprised of polyethylene or polypropylene.

9. The secondary lithium ion battery of claim 1, wherein the negative active material layer comprises, in weight %:

| | |
|---|---|
| polythiocyanogen | 50 to 70; |
| binder | 5 to 15; |
| electrically conductive material | 25 to 35; | the total weight of polythiocyanogen, binder and electrically conductive material equaling 100%.

10. The secondary lithium ion battery of claim 1, wherein the polythiocyanogen corresponds to formula $(SCN)_x$, where x is 3 to 10,000.

11. The secondary lithium ion battery of claim 1, wherein the polythiocyanogen has been prepared by polymerization of a thiocyanogen or thiocyanogen-containing material of the formula $(SCN)_x$ where x is 2 or 3, a halothiocyanogen of the formula YSCN where Y is F, Cl, Br or I, or a metal thiocyanogen of the formula $M(SCN)_x$ where M is Pb, Li, Na, K, Cu, Ni, Co or $NH_4^+$ and x is 2 or 3.

12. The secondary lithium ion battery of claim 11, wherein the thiocyanogen or thiocyanogen-containing material of the formula $(SCN)_x$ where x is 2 or 3, halothiocyanogen of the formula YSCN where Y is F, Cl, Br or I, or metal thiocyanogen of the formula $M(SCN)_x$ where M is Pb, Li, Na, K, Cu, Ni, Co or $NH_4^+$ and x is 2 or 3 has been prepared by chemical or electrochemical oxidation of $NH_4SCN$, NaSCN or KSCN.

* * * * *